(12) United States Patent
Dunn (10) Patent No.: US 8,753,731 B2
(45) Date of Patent: Jun. 17, 2014

(54) ANTI-ABRASIVE PROTECTIVE PACKAGING MATERIAL AND METHOD OF MAKING THEREOF

(75) Inventor: Charles M. Dunn, Providence, RI (US)

(73) Assignee: Premark Packaging LLC, Glenview, IL (US)

( * ) Notice: Subject to any disclaimer, the term of this patent is extended or adjusted under 35 U.S.C. 154(b) by 456 days.

(21) Appl. No.: 13/051,292

(22) Filed: Mar. 18, 2011

(65) Prior Publication Data

US 2012/0237717 A1 Sep. 20, 2012

(51) Int. Cl.
*B32B 29/00* (2006.01)
*C09J 5/04* (2006.01)
*B65D 81/02* (2006.01)

(52) U.S. Cl.
USPC ............................. 428/83; 428/34.2; 428/116

(58) Field of Classification Search
USPC .......................................... 428/83, 34.2, 116
See application file for complete search history.

(56) References Cited

U.S. PATENT DOCUMENTS

| | | | |
|---|---|---|---|
| 3,734,389 A * | 5/1973 | Brown | 206/586 |
| 4,606,959 A * | 8/1986 | Hillinger | 428/116 |
| 5,163,892 A | 11/1992 | Morris | |
| 5,402,657 A | 4/1995 | Henry, Jr. | |
| 5,733,403 A | 3/1998 | Morley | |
| D407,647 S | 4/1999 | Merricks et al. | |
| 5,914,171 A | 6/1999 | Morley | |
| 7,204,070 B2 | 4/2007 | Mertz, II et al. | |
| 7,334,381 B2 | 2/2008 | Mertz, II et al. | |
| 2009/0072441 A1* | 3/2009 | Bracke | 264/271.1 |

* cited by examiner

*Primary Examiner* — Brent O'Hern
(74) *Attorney, Agent, or Firm* — Neal, Gerber & Eisenberg LLP (57) ABSTRACT

A packaging material for protecting a packaged product is disclosed. The packaging material includes a core material having a plurality of cells with open tops and bottoms A first reinforcing layer covers the open tops of the cells of the core material. A second reinforcing layer covers the open bottoms of the cells of the core material. A layer of anti-abrasive material is attached to the first reinforcing layer. A second layer of anti-abrasive material may be attached to the second reinforcing layer. The packaging material may be formed into angle pads, corner pads and channel protectors also.

19 Claims, 9 Drawing Sheets

ANTI-ABRASIVE PROTECTIVE PACKAGING MATERIAL AND METHOD OF MAKING THEREOF

BACKGROUND OF THE INVENTION

1. Field of the Invention

The present patent document relates generally to packaging materials used to protect a product during shipping and handling and more particularly to an improved packaging material that is anti-abrasive.

2. Background of the Related Art

Packaging materials used to protect objects from damage during shipping and handling is well known in the art. However, a known problem in the prior art is protecting finished surfaces on a product that is easily scratched, yet still minimizing the cost of the packaging material. In the packaging industry, minimizing the cost of the packaging material is of great concern, second only to protecting the packaged object.

To solve the problem of protecting a finished surface that is easily scratched, one prior art solution is to apply wax to the surface of the packaging material that will rub against the finished surface of the product. However, the disadvantage of using wax is that it does not provide sufficient anti-abrasive protection to easily scratched products.

Another prior art solution to protecting finished surfaces on a product is to drape the entire product in a sheet of anti-abrasive material, such as polyethylene film or a polyethylene foam sheet, prior to packaging the product. However, this method is undesirable because of the added cost of labor to drape the product and the additional cost of the sheet of anti-abrasive material being used to drape over the product. Also, if this prior-art draping method is used with polyethylene film or polyethylene foam sheet, the method is not environmentally friendly.

Therefore, there is a perceived need in the industry for a packaging material that is inexpensive and adds greater anti-abrasive protection to easily scratched products. Additionally there is the perceived need for an improved anti-abrasive packaging material that is also easily recycled.

SUMMARY OF THE INVENTION

The present invention solves the problems of the prior art by providing a packaging material that includes a honeycomb material having a number of hexagonal cells with open tops and bottoms. A first reinforcing layer covers the open tops of the hexagonal cells of the honeycomb material. A second reinforcing layer covering the open bottoms of the hexagonal cells of the honeycomb material. A layer of anti-abrasive material is provided on the first reinforcing layer.

Among the objects of the present invention is the provision for a packaging material that is high strength.

Another object of the present invention is the provision for a packaging material that includes an anti-abrasive layer.

Another object of the present invention is the provision for a packaging material that is recyclable.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
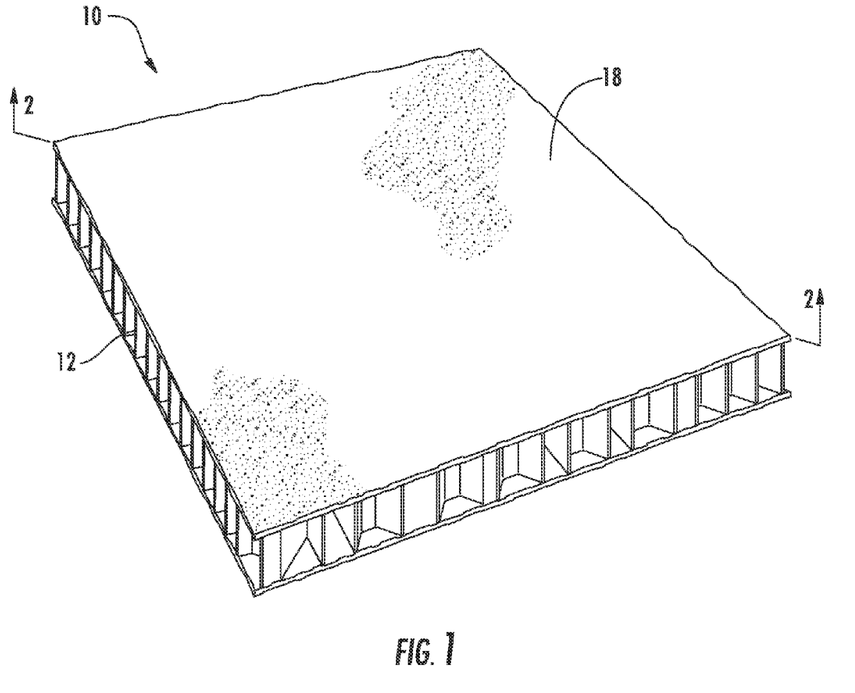
FIG. 1 is a perspective view of the packaging material of the present invention.
Figure 2:
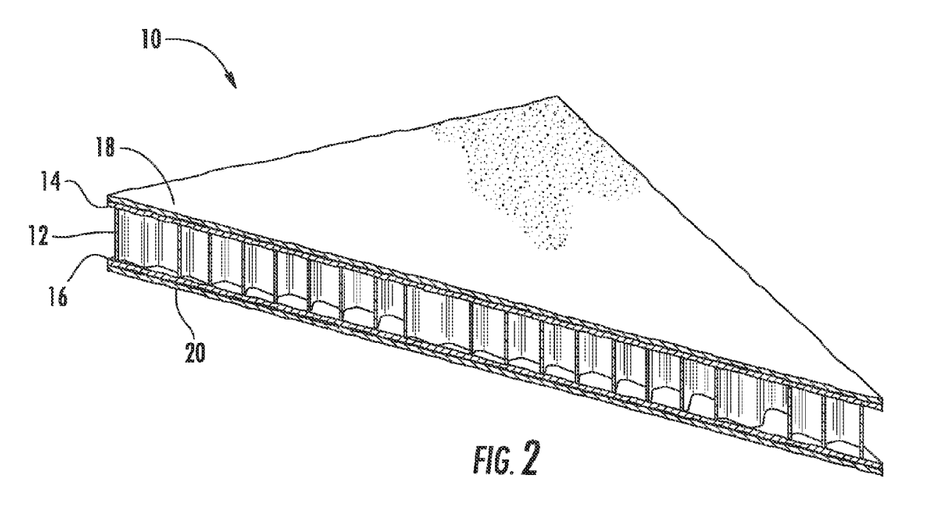
FIG. 2 is a cross-section view through line 2-2 of FIG. 1.
Figure 3:
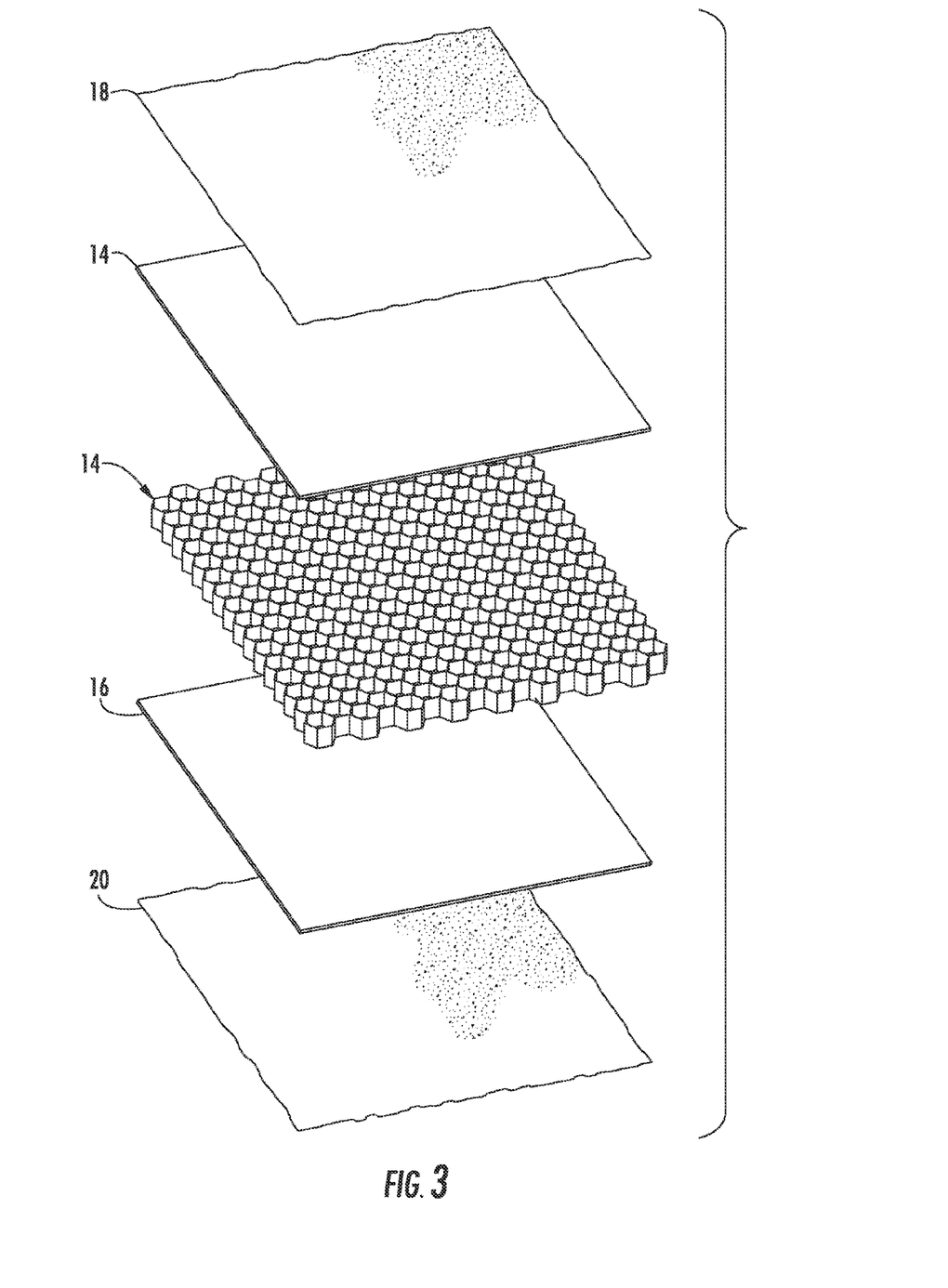
FIG. 3 is an exploded view of the packaging material of the present invention.

Referring now to FIGS. 1-3, a section of packaging material of the present invention is shown generally at 10. The packaging material includes a core 12 made of a paperboard material having a number of cells. Preferably the core 12 is made of a paperboard honeycomb material which is desirable for its efficient use of material and superior strength. However, other cellular structures may be used. Cellular structures are preferred because they add bulk to the packaging material 10 without adding excess weight. The honeycomb core 12 includes a plurality of hexagonal cells with open top and open bottom ends.

Covering the open top end and open bottom ends of the hexagonal cells of the honeycomb core 12 are reinforcing layers 14, 16 of paperboard to add stiffness and rigidity to the honeycomb core 12. The reinforcing layers 14, 16 are adhered to the honeycomb core 12 thereby preventing the honeycomb core 12 from laterally collapsing in on itself.

The reinforcing layers 14, 16 of paperboard may be single ply or multi-ply and may also be corrugated to provide the desired stiffness and weight to the packaging material 10. The paperboard may also be of any desired basis weight (i.e., thickness or gauge). For instance, suitable types of paperboard materials could be boxboard, cartonboard, corrugated boxboard, Kraft board, laminated board, solid bleached board ("SBB"), Solid bleached sulphate ("SBS"), solid unbleached board ("SUB"), white lined chipboard ("WLC"), containerboard, corrugated fiberboard, corrugated medium, linerboard, Binder's board, and combinations thereof.

Adhered to the top reinforcing layer 14 covering the open tops of the honeycomb core 12 is a first anti-abrasive layer 18 formed from tissue paper or micro-foam. It has been found that a layer of tissue paper or micro-foam makes the packaging material 10 soft and slippery to avoid scratches to finished surfaces of many kinds of packaged objects. Specifically, cellulous tissue and air laid tissues have been found suitable; however, others may be used. Polyethylene foam sheeting and polypropylene micro-foams have also been found to be suitable; however, others may be used. A second anti-abrasive layer 20 may be adhered to the bottom reinforcing layer 16 in order to make a packaging material 10 that includes an anti-abrasive surface on both sides of the packaging material 10.

Not only can the packaging material 10 of the present invention be used to protect flat surfaces of a product, the packaging material 10 is easily cut to form angle pads, channel protectors and corner pads as well.

Figure 4A:
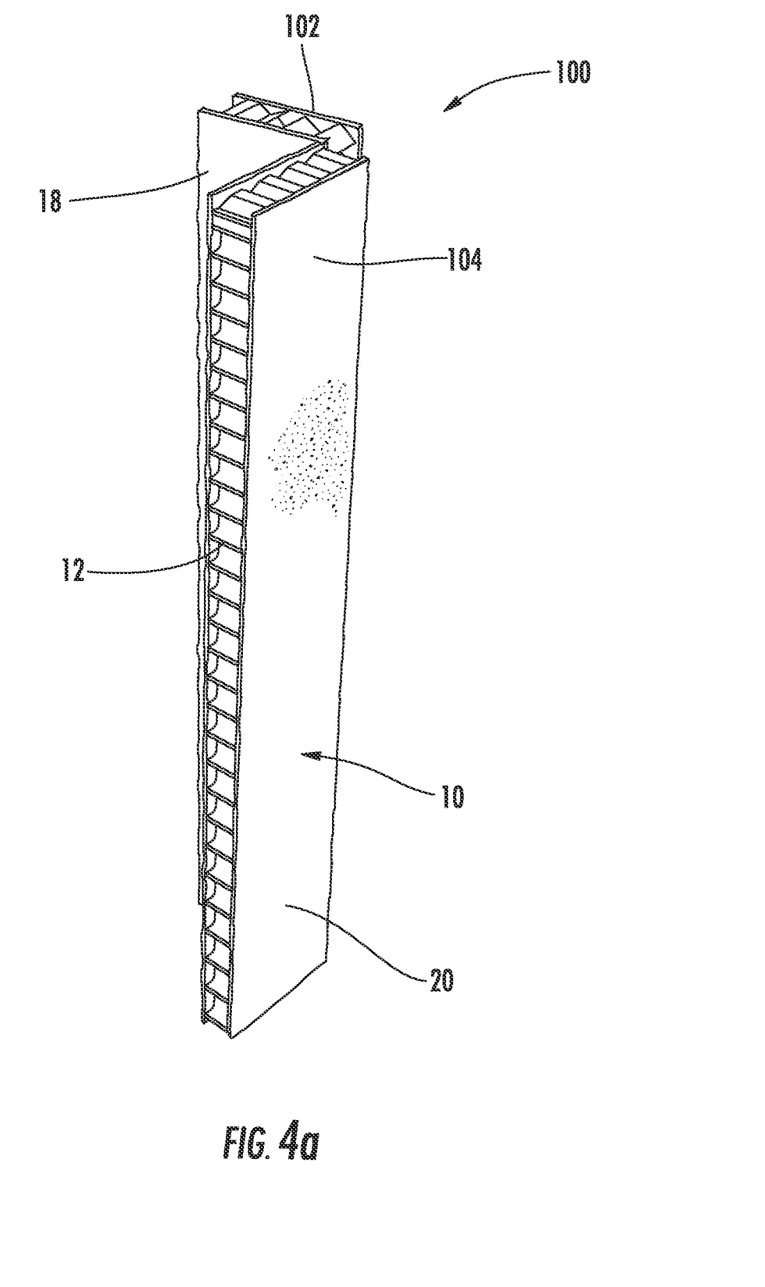
FIG. 4a is a perspective view of an angle pad formed from the packaging material of the present invention.
Figure 4B:
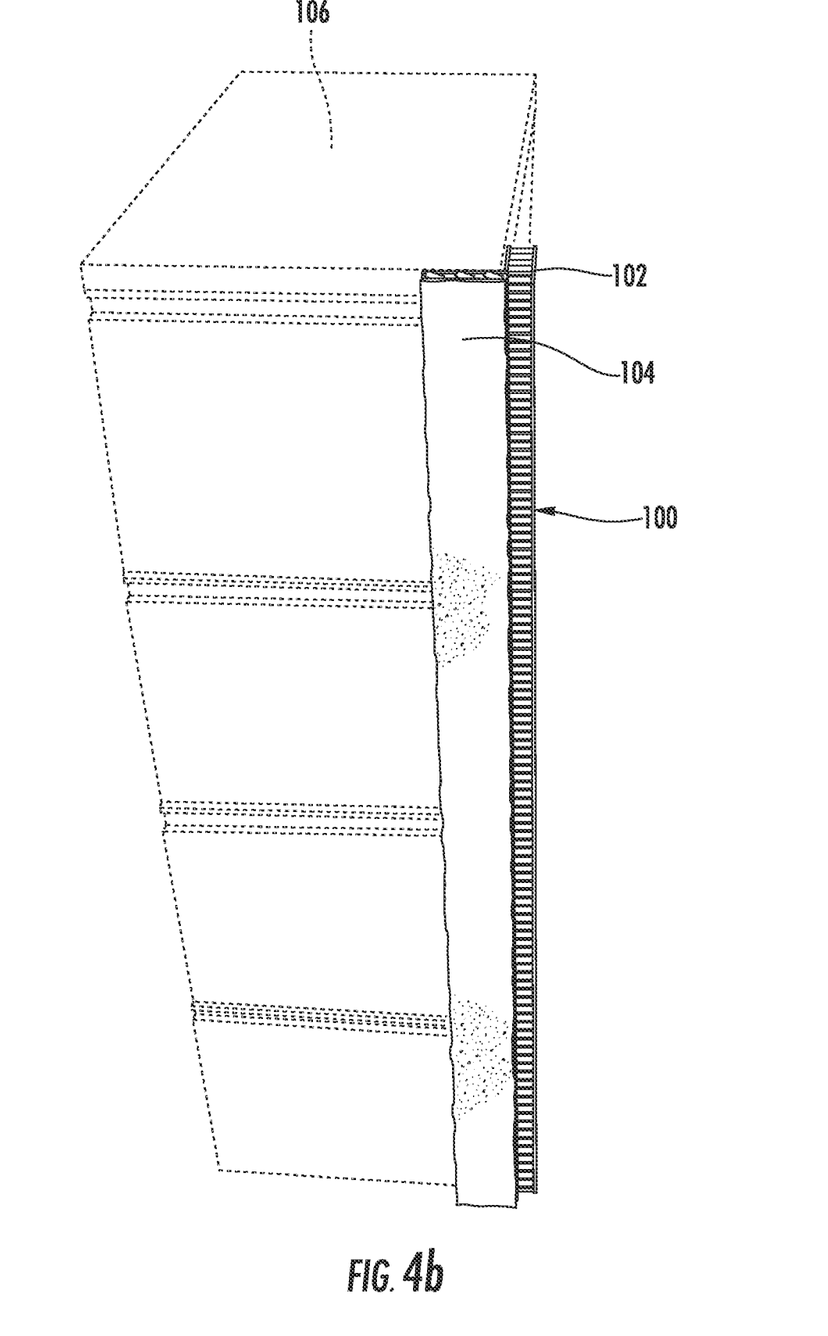
FIG. 4b is a perspective view of an angle pad formed form the packaging material of the present invention shown against the edge of a product.

Turning now to FIGS. 4a and 4b, an angle pad 100 may be formed from the packaging material 10 of the present invention. Angle pads 100 are useful to protect the edge of a product 104 during shipping. In this embodiment, a section of packaging material 10 is selected of sufficient length to cover the edge of a product. The packaging material 10 is scored through the optional second anti-abrasive layer 20, second reinforcing layer 16 and honeycomb core 12 into two sections 102, 104. The two sections 102, 104 are folded inwardly to form a ninety degree angle (or other desired angle) in order to fit against the edge of a product 106 that is to be packaged. The first anti-abrasive layer 18 and reinforcing layers 14 are not scored and retain the two sections 102, 104 of the packaging material 10 together to form the angle pads 100.

Figure 5A:
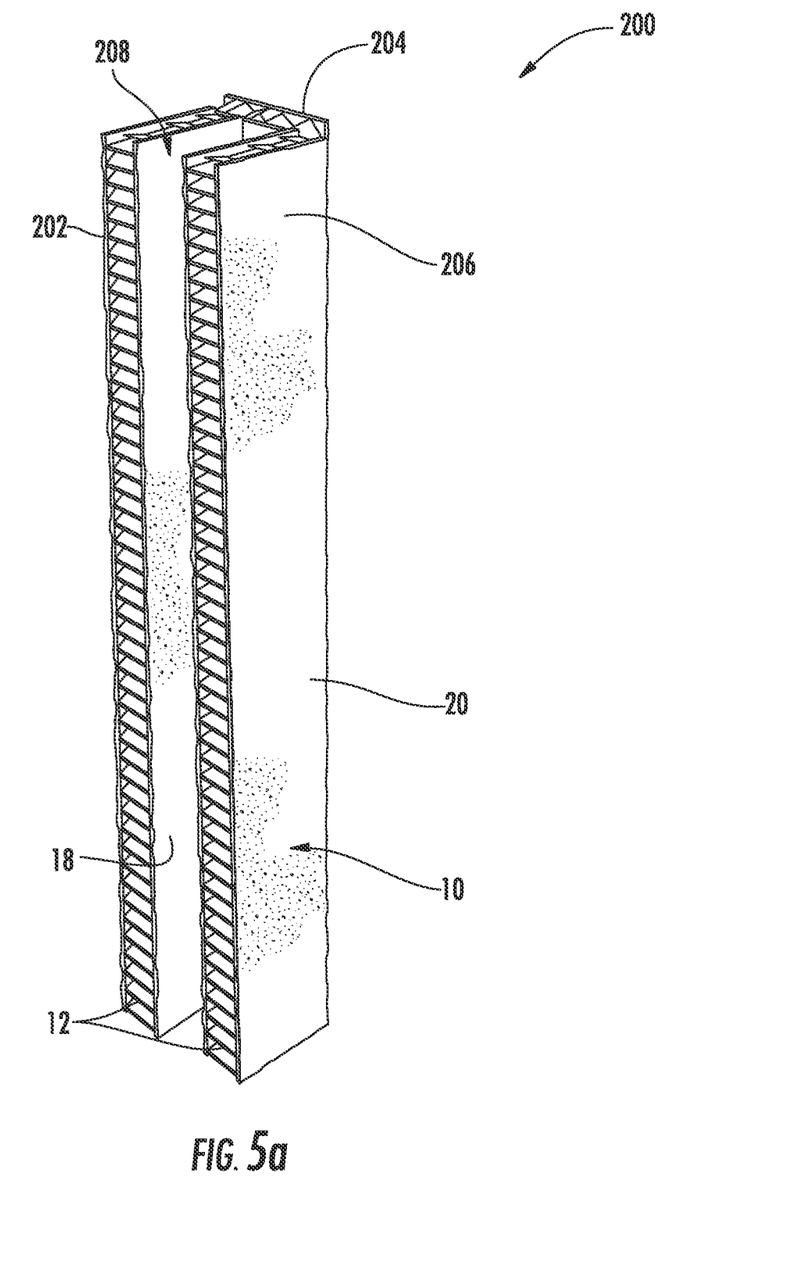
FIG. 5a is a perspective view of a channel protector formed from the packaging material of the present invention.
Figure 5B:
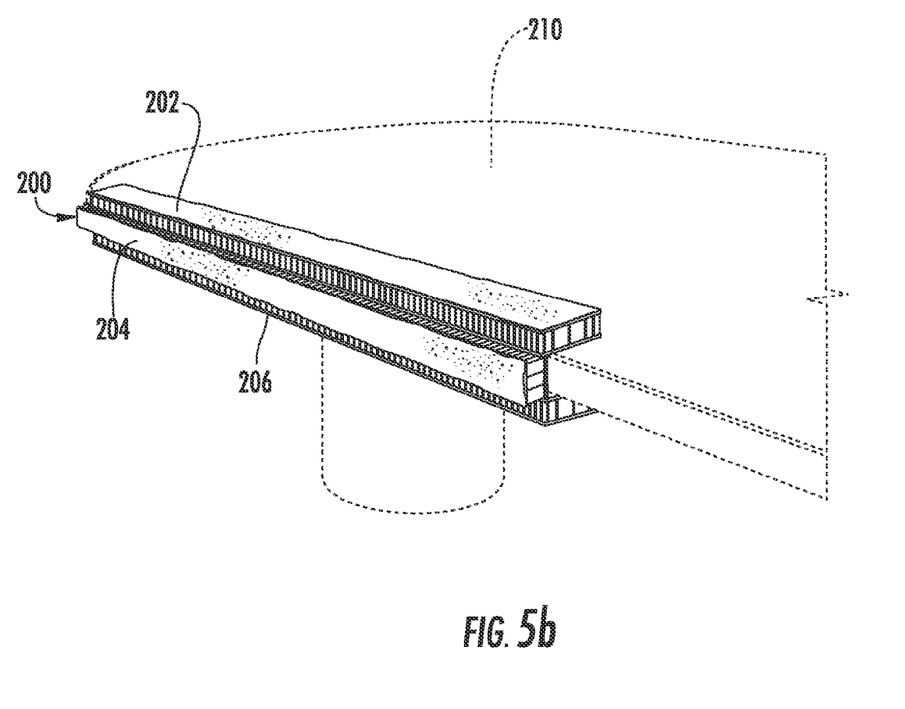
FIG. 5b is a perspective view of a channel protector formed form the packaging material of the present invention shown enveloping the narrow edge of a product.

Turning now to FIGS. 5a and 5b, a channel protector 200 may be formed from the packaging material 10 of the present invention. Channel protectors 200 are useful to protect the thin articles or narrow edges of a product 210 during shipping. In this embodiment, a section of packaging material 10 is selected of sufficient length to cover the thin article or narrow edge of a product. The packaging material 10 is scored twice through the optional second anti-abrasive layer 20, second reinforcing layer 16 and honeycomb core 12 into three sections 202, 204, 206. The outer two sections 202, 206 are folded inwardly and towards the innermost section 204 to form a U-shaped channel 208 (or other desired angle) in order to fit against the thin article or the narrow edge of a product 210 that is to be packaged. The first anti-abrasive layer 18 and reinforcing layers 14 are not scored and retain the three sections 202, 204, 206 of the packaging material 10 together to form the channel protector 200.

Figure 6A:
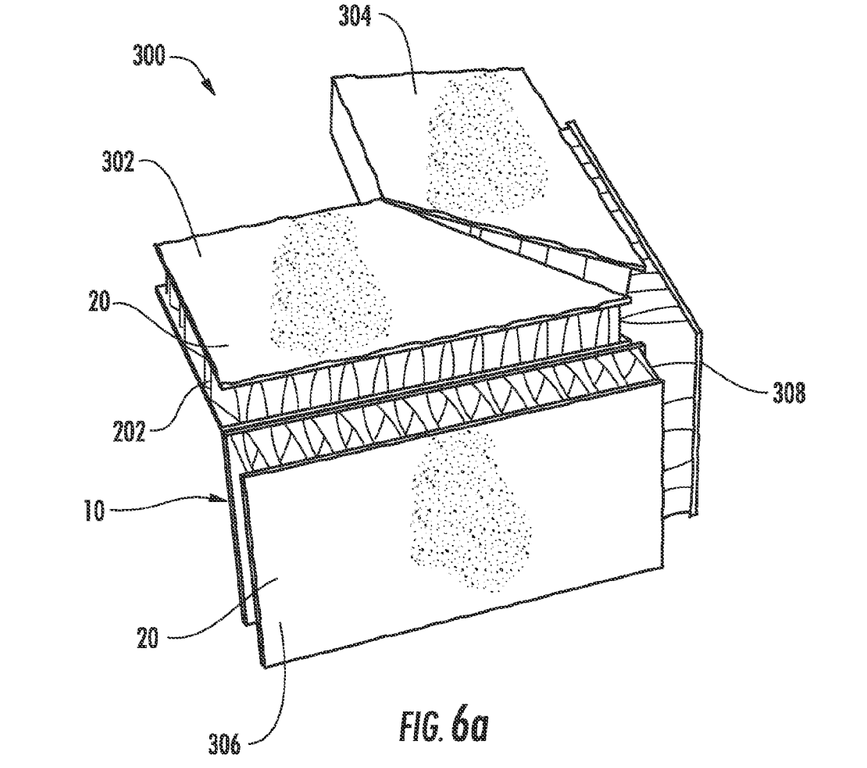
FIG. 6a is a perspective view of a corner pad formed from the packaging material of the present invention.
Figure 6B:
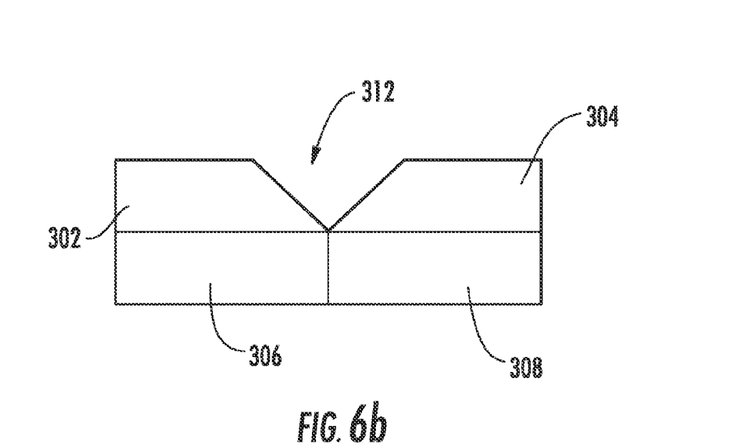
FIG. 6b is a plan view of a packaging material of the present invention showing how the packaging material is scored and notched in order to form a corner pad.
Figure 6C:
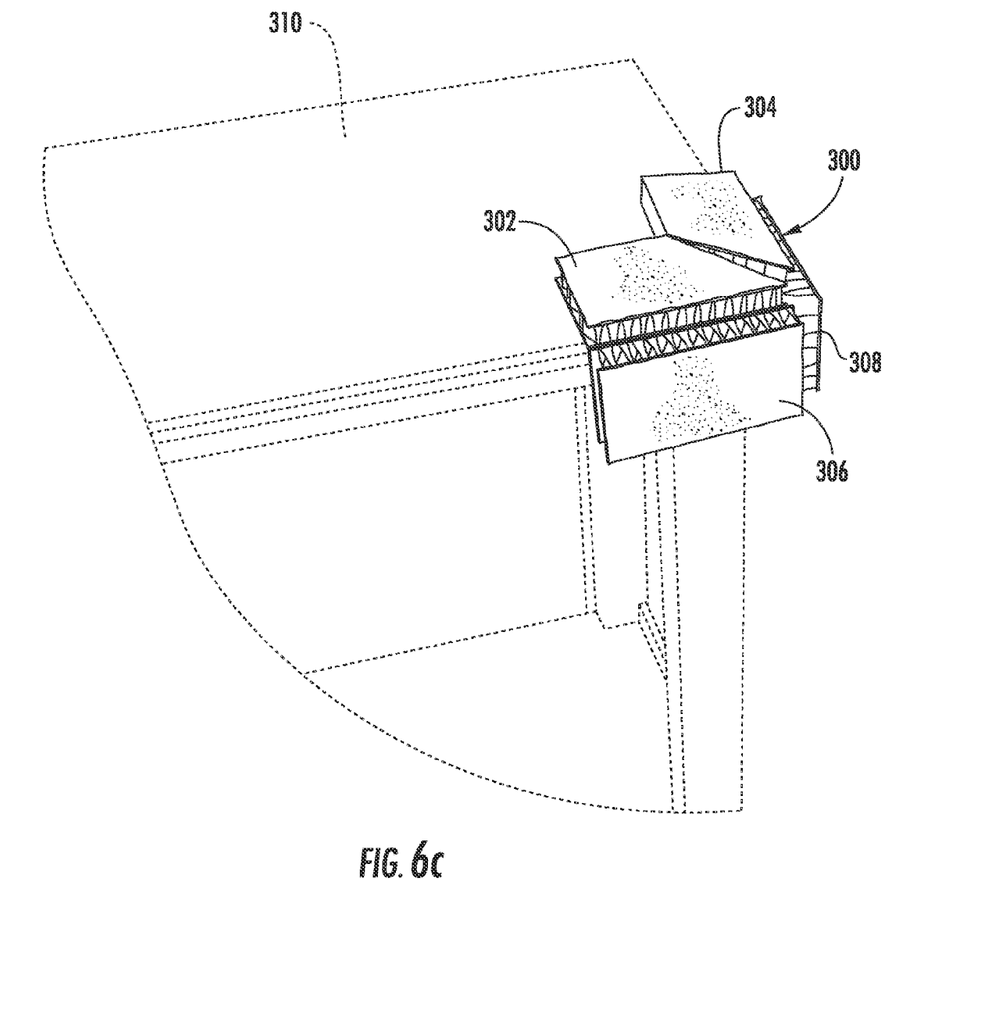
FIG. 6c is a perspective view of a corner pad formed form the packaging material of the present invention shown against the corner of a product.

Turning now to FIGS. 6a, 6b and 6c, a corner pad 300 may be formed from the packaging material 10 of the present invention. Corner pads 300 are useful to protect the corners of a product during shipping and are fabricated by mitering or "notching" angle pads 100 to fold 90 degrees around the corner of the product to be packaged. More particularly, a section of packaging material 10 is selected of sufficient length to cover the corner of a product 310. The packaging material 10 is scored down the center through the optional second anti-abrasive layer 20, second reinforcing layer 16 and honeycomb core 12 into two sections. The packaging material 10 is scored again offset ninety degrees from the first score mark, thereby quartering the packaging material 10 into four section 302, 304, 306, 308. A V-shaped notch 312 is cut into two of the section 302, 304 in the middle of the packaging material 10.

The four sections 302, 304, 306, 308 are folded inwardly to form a ninety degree angle (or other desired angle depending up the angle of the V-shaped notch) in order to fit against the corner of a product 310 that is to be packaged. The relief from the V-shaped notch permits the four sections 302, 304, 306, 308 to be folded inwardly.

The first anti-abrasive layer 18 and reinforcing layers 14 are not scored and retain the four sections 302, 304, 306, 308 of the packaging material 10 linked together to form the corner post 300.

Therefore, it can be seen that the present invention provides a unique solution to the problem of providing an improved protective packaging material that is anti-abrasive. Furthermore, because the protective packaging material is manufactured mostly from paper-based materials it is easily recyclable and can also be made from recycled materials as well. Furthermore, the use of recycled materials and/or paper-based materials makes the packaging product inexpensive, which is highly desirable. Although the use of tissue as an anti-abrasive material is desirable because it is easily recyclable, use of a non-recyclable or a not easily recyclable micro-foam as the anti-abrasive material is warranted where it is critical to maximize the anti-abrasive property of the packaging material. That is, micro-foam may be preferable to tissue where the anti-abrasive material is desired to be extra slippery, or anti-abrasive.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A packaging material comprising:
   a core material having a plurality of cells with open tops and bottoms;
   a first reinforcing layer attached to the open tops of the cells of the core material;
   a second reinforcing layer attached to the open bottoms of the cells of the core material; and
   a first layer of anti-abrasive material attached to the first reinforcing layer, said first layer of anti-abrasive material including a first layer of tissue paper, wherein said core material, said first reinforcing layer, said second reinforcing layer, and said first layer of anti-abrasive material are formed into a corner post.

2. The packaging material of claim 1, which includes a second layer of anti-abrasive material attached to the second reinforcing layer, said second layer of anti-abrasive material including a second layer of tissue paper.

3. The packaging material of claim 1, wherein the first reinforcing layer is paperboard.

4. The packaging material of claim 3, wherein the first reinforcing layer is a single ply of paperboard.

5. The packaging material of claim 3, wherein the second reinforcing layer is paperboard.

6. The packaging material of claim 5, wherein the second reinforcing layer is a single ply of paperboard.

7. The packaging material of claim 1, wherein the core material is a honeycomb material having a plurality of hexagonal cells with open tops and bottoms.

8. A packaging material comprising:
   a core material having a plurality of cells with open tops and bottoms;
   a first reinforcing layer attached to the open tops of the cells of the core material;
   a second reinforcing layer attached to the open bottoms of the cells of the core material; and
   a first layer of anti-abrasive material attached to the first reinforcing layer, said first layer of anti-abrasive material including a first layer of micro-foam.

9. The packaging material of claim 8, which includes a second layer of anti-abrasive material attached to the second reinforcing layer, said second layer of anti-abrasive material including a second layer of micro-foam.

10. The packaging material of claim 8, formed into a corner post.

11. The packaging material of claim 8, formed into a channel protector.

12. The packaging material of claim 8, formed into an angle protector.

13. The packaging material of claim 8, wherein the first reinforcing layer is paperboard.

14. The packaging material of claim 13, wherein the first reinforcing layer is a single ply of paperboard.

15. The packaging material of claim 13, wherein the second reinforcing layer is paperboard.

16. The packaging material of claim 15, wherein the second reinforcing layer is a single ply of paperboard.

17. The packaging material of claim 8, wherein the core material is a honeycomb material having a plurality of hexagonal cells with open tops and bottoms.

18. A packaging material comprising:
- a core material having a plurality of cells with open tops and bottoms;
- a first reinforcing layer attached to the open tops of the cells of the core material;
- a second reinforcing layer attached to the open bottoms of the cells of the core material; and
- a first layer of anti-abrasive material attached to the first reinforcing layer, said first layer of anti-abrasive material including a first layer of tissue paper, wherein said core material, said first reinforcing layer, said second reinforcing layer, and said first layer of anti-abrasive material are formed into a channel protector.

19. A packaging material comprising:
- a core material having a plurality of cells with open tops and bottoms;
- a first reinforcing layer attached to the open tops of the cells of the core material;
- a second reinforcing layer attached to the open bottoms of the cells of the core material; and
- a first layer of anti-abrasive material attached to the first reinforcing layer, said first layer of anti-abrasive material including a first layer of tissue paper, wherein said core material, said first reinforcing layer, said second reinforcing layer, and said first layer of anti-abrasive material are formed into an angle protector.

* * * * *